United States Patent Office 2,781,623
Patented Feb. 19, 1957

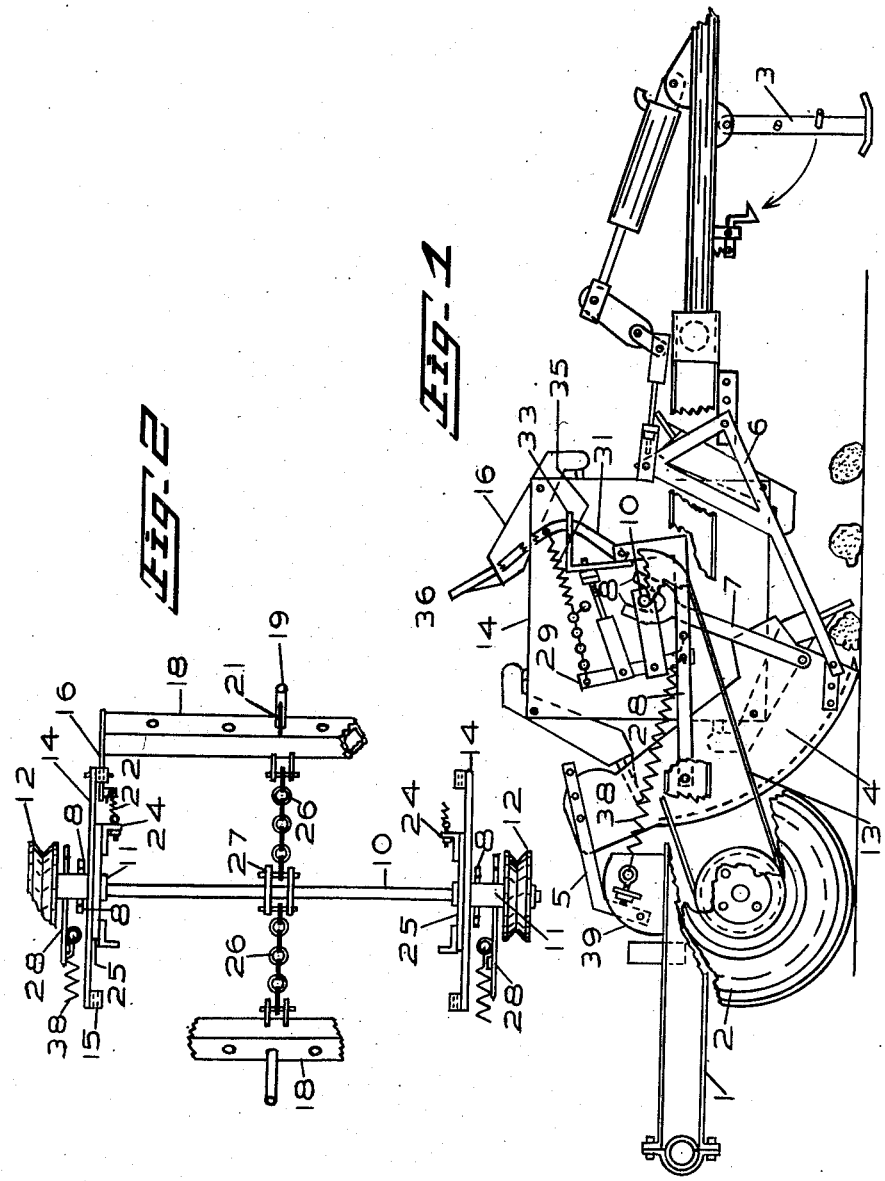

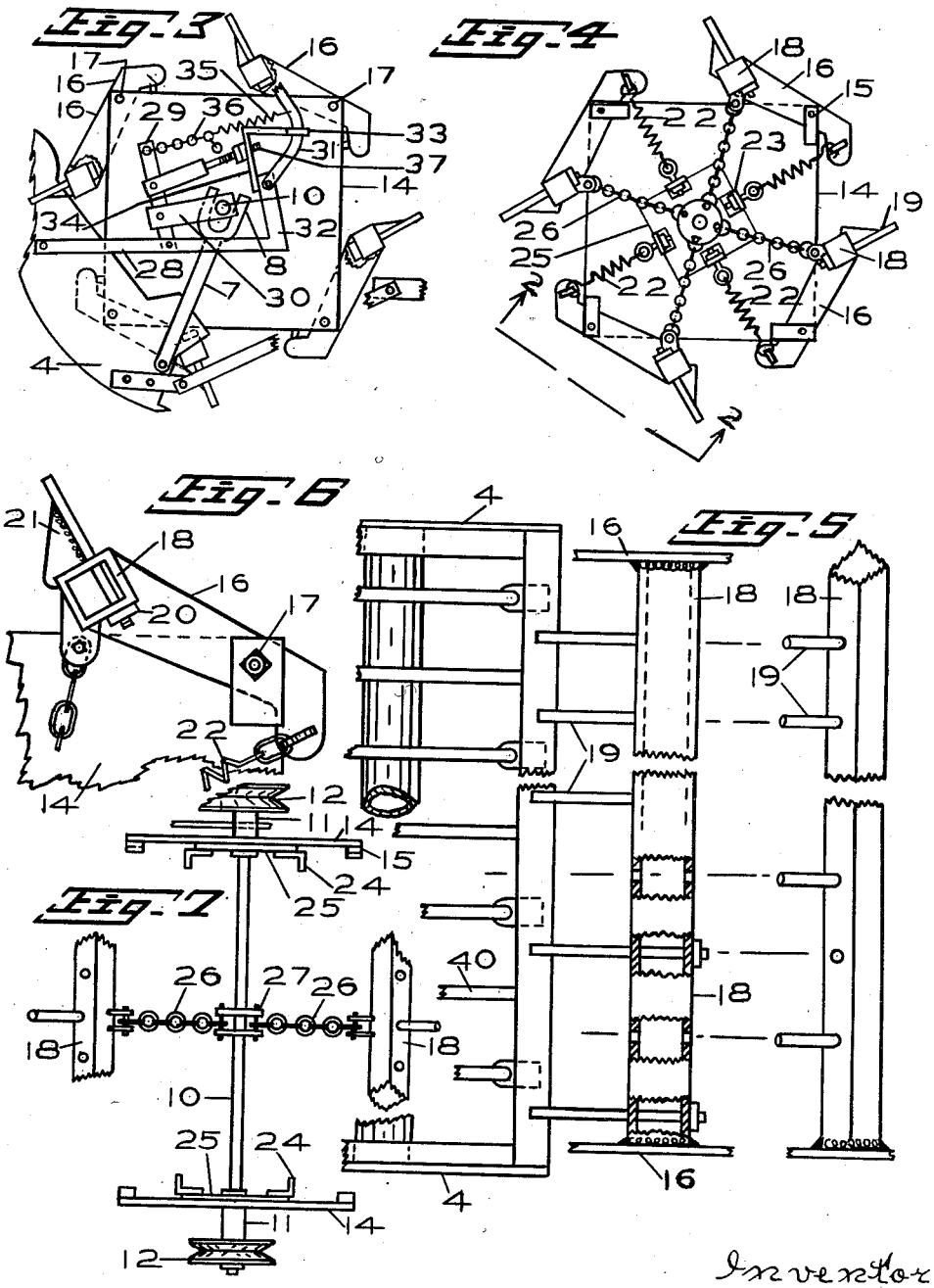

2,781,623

STONE GATHERING MACHINE

Peter Britanius Anderson, Southey, Saskatchewan, Canada

Application December 21, 1954, Serial No. 476,714

2 Claims. (Cl. 55—17)

My invention relates to stone gathering machines, having reference to a device wherein a gathering apron is employed for picking the stones off the ground, the present invention being directed to an improved reel for urging the stones on to and up the apron.

The device contemplates use with a machine wherein the apron is mounted to swing upward and rearward, as when encountering a stone too large or deeply embedded to handle, and for the purpose of this the reel as herein shown is mounted to be carried by the apron and employs a series of spring held fingers adapted for urging the stones, both by aiding in dislodging the stones from the ground and in moving the stones up the apron for delivery to a dump.

One of the objects of the invention is to provide an improved reel for use on a stone gathering machine adapted for co-operating with a gathering apron for assisting in dislodging stones from the ground and moving the stones up the apron.

A still further object of the invention is to provide such a device in which the apron has a series of teeth and the reel includes fingers for co-operation therewith, and further including a mounting for the reel on the apron for the reel to be carried thereby.

Other features and advantages of the invention will become apparent by reference to the accompanying description taken in conjunction with the drawings wherein like characters of reference indicate like parts throughout the several views and wherein:

Fig. 1 is a side view of a machine mounting my improved reel, parts being shown broken away.

Fig. 2 is a plan view of the reel taken by itself, shown broken away in part and with parts omitted, and taken on line 2—2 of Fig. 4.

Fig. 3 is an end view of the reel shown with a fragment of the apron, the reel being shown broken away in part.

Fig. 4 is an end view of the reel shown with the near end plate and associated parts removed to disclose the workings of the springs and chains.

Fig. 5 shows a plan view broken away in part of the reel bars and apron, illustrating alignment of the reel fingers and apron teeth.

Fig. 6 shows a detail fragment of a reel apron with reel arm and tooth bar and including fragments of a chain and spring.

Fig. 7 shows a somewhat diagrammatic plan view of the reel taken by itself, shown broken away and with parts removed.

Having reference to the drawings there is shown in Figure 1 a machine of a character adapted to mount my improved reel. In this 1 indicates the near frame side bar, 2 a traction wheel, 3 the jiffy stand and 4 an apron suspended in the frame as by upper and lower pivotally mounted arms 5 and 6 by which the apron may swing up and back to avoid an obstruction such as a stone too large or deeply embedded to handle.

The reel disclosed in the present invention is designed for mounting on such an apron and for which arms 7 would be provided with forked ends 8, one for each end of the apron pivoted on the end plates thereof. In the forks of these arms is carried free to rotate a reel shaft 10, said shaft providing sleeves 11 at the ends for seating in the forks 8 and pulley wheels 12 by which the reel may be driven from the traction wheels 2, as by belts 13.

On the sleeves 11 of the reel shaft are end plates 14, each providing blocks 15 fixed to the inner sides of the plates at the corners and carrying arms 16 pivoted on pins 17. The arms 16 are aligned in opposing pairs and each pair carries a bar 18 that is square in cross section and on which teeth or fingers 19 are mounted at intervals, the fingers providing threaded ends to be engaged by nuts 20, and may be reinforced by flanges 21, Figure 5.

The opposite ends of the arms 16 are engaged by springs 22 anchored by eye bolts 23 to arms 24 on inner plates 25 fixed to the reel end plates 14, these springs opposing retraction of the finger bars 18 and fingers 19, as when an obstruction is encountered, and permitting the fingers to draw back and pass over the obstruction. As against this the finger carrying bars 18 are anchored by chains 26 attached to a clamp 27 on the reel shaft 10.

Additionally it is desirable to have the reel shaft anchored to the apron free to pivot thereon to allow the reel to raise with the apron and including automatic belt tightening and releasing means.

For this angle arms 28 are provided, Figs. 1 and 2, pivoted on the apron and to which are attached, fixed thereto, uprights 29 on which are bars 30 engaging the reel shaft.

For maintaining tension on the reel drive belts I provide levers 31 pivoted to right angular portions 32 of the arms 28 and engageable with legs 33 of angle rods 34, these legs providing a notch or the like by which the levers 31 are engageable.

Between the levers 31 and uprights 29 are springs 35 attached to the levers and to the uprights by chains 36, the chain connection with the springs including extra lengths to increase or decrease the tension on the springs 35. There is further provided threaded rods 37 fixed to the uprights 29 and adjustably engaged with the angle rods 34. There are also provided stabilizing springs 38, Figure 1, between the reel plates and lugs 39 on the main frame.

The apron 4 would include teeth 40 and the fingers 19 of the reel would align with the intervals between these teeth for cleaning material from between the teeth and dislodging small stones.

In the use of the device the reel, through its driving connection with the traction wheels by belt 13, may drive the reel both forwardly and backwardly, so that on reverse of the machine it may assist in cleaning the apron. The reel during forward motion of the machine is driven clockwise and co-operates with the apron in moving stones on to the apron and in cleaning debris from between the apron teeth.

Should the apron move upward, as when an obstruction is encountered, the reel moves upward with it. During rotation of the reel the fingers 19 assist in dislodging the stones from the ground and urging them on to the apron. The reel arms 16 carrying the finger bars 18 are permitted to give when an obstruction is encountered by reason of the springs 22, but are held rigid during a reverse movement of the reel.

In the use of the belt tensioning device, the lever 31 may be disengaged from the arm 33 and the chain 36 disengaged from the spring 35 and then re-engaged to lengthen or shorten the connection and for which extra links would be provided in the chain, and the lever 31 is then engaged once more with the arm 33. It is also used for releasing tension on the belt 13 for removal or replacement of the belt.

While I have herein disclosed a preferred embodiment of my invention, what I claim and wish to secure by Letters Patent is:

1. In a stone gathering machine providing a main frame and a gathering apron suspended to swing in the frame, a reel carried by the apron, said reel comprising a shaft which means by which the shaft may be connected to be driven, end plates fixed on the shaft, arms intermediately pivotally mounted at quarterly intervals on the peripheral portions of the end plates, springs connecting the one end of each of the arms to the end plates constraining the arms against movement in one direction, bars carried on the other ends of the arms extending transversely between the end plates, teeth on the bars, anchoring means securing the bars against movement of the arms in the other direction, and upstanding arms on the apron, said upstanding arms providing forks in which the reel is rotatable.

2. A device as defined in claim 1 in which the upstanding arms are pivoted on the apron, and including means anchoring the reel shaft to the apron, and spring restraining means between said anchoring means and the main frame of the machine.

References Cited in the file of this patent

UNITED STATES PATENTS

| | | |
|---|---|---|
| 1,106,190 | Conine | Aug. 4, 1914 |
| 1,723,608 | Dott et al. | Aug. 6, 1929 |
| 2,141,557 | Reiter | Dec. 27, 1938 |